(12) United States Patent
Ustinov (10) Patent No.: US 8,168,929 B2
(45) Date of Patent: May 1, 2012

(54) NON-POWERED, AERO-ASSISTED PRE-STAGE FOR BALLISTIC ROCKETS AND AERO-ASSISTED FLIGHT VEHICLES

(76) Inventor: Eugene Alexis Ustinov, Altadena, CA (US)

( * ) Notice: Subject to any disclaimer, the term of this patent is extended or adjusted under 35 U.S.C. 154(b) by 601 days.

(21) Appl. No.: 12/321,039

(22) Filed: Jan. 15, 2009

(65) Prior Publication Data

US 2009/0179106 A1    Jul. 16, 2009

Related U.S. Application Data

(60) Provisional application No. 61/011,119, filed on Jan. 15, 2008.

(51) Int. Cl.
*B64G 1/14* (2006.01)
(52) U.S. Cl. .................. 244/3.25; 244/159.3; 244/63
(58) Field of Classification Search .............. 244/3.25, 244/158.9, 159.3, 36, 160, 63
See application file for complete search history.

(56) References Cited

U.S. PATENT DOCUMENTS

| 3,147,936 A * | 9/1964 | Mercille | 244/2 |
| 4,802,639 A * | 2/1989 | Hardy et al. | 244/2 |
| 4,901,949 A | 2/1990 | Elias | |
| 5,255,873 A | 10/1993 | Nelson | |
| 5,626,310 A | 5/1997 | Kelly | |
| 6,029,928 A | 2/2000 | Kelly | |
| 6,454,216 B1 * | 9/2002 | Kiselev et al. | 244/159.3 |
| 2011/0198434 A1 * | 8/2011 | Ustinov | 244/2 |

FOREIGN PATENT DOCUMENTS

WO    WO 2010021295 A1 *    2/2010

OTHER PUBLICATIONS

Sarigul-Klijn, A Study of Air Launch Methods for RLV's, AIAA Paper 2001-4619.

* cited by examiner

*Primary Examiner* — Benjamin P Lee (57) ABSTRACT

A non-powered pre-stage (10) with a commensurably large wing area is used to launch a variety of single-stage and multiple-stage space vehicles (20), such as conventional ballistic rockets and prospective spaceplanes, from conventional runways. This method of launch eliminates need in dedicated ground launch structures and/or dedicated long runways. The vehicle to be launched (20) is mated to this non-powered aero-assisted pre-stage (NAP) (10), with their flight directions aligned, using a lock-and-release mechanism (30). The resulting stack takes off like a conventional airplane using the propulsion of the vehicle and aerodynamic lift of the NAP. After the desired trajectory of the vehicle is achieved, the vehicle is separated from the NAP and continues its ascent. The NAP returns back to the surface for reuse or disposal. Thus, a wide variety of conventional airfields can be used for launch of ballistic and aero-assisted flight vehicles.

20 Claims, 4 Drawing Sheets

NON-POWERED, AERO-ASSISTED PRE-STAGE FOR BALLISTIC ROCKETS AND AERO-ASSISTED FLIGHT VEHICLES

CROSS-REFERENCE TO RELATED APPLICATION

This application claims the benefit of provisional patent application Ser. No. 61/011,119, filed Jan. 15, 2008 by the present inventor.

FEDERALLY SPONSORED RESEARCH

Not Applicable

SEQUENCE LISTING OR PROGRAM

Not Applicable

BACKGROUND OF THE INVENTION

1. Field

This application generally relates to the launch of flight vehicles, specifically to enabling the launch of ballistic rockets and aero-assisted flight vehicles (spaceplanes) from conventional runways, without use of, respectively, dedicated ground launch structures or dedicated runways.

2. Prior Art

From the dawn of Space Era through present time, all space launches—sub-orbital, orbital, and beyond—have been accomplished almost solely using ballistic (wingless) rockets launched from the ground. This approach requires dedicated ground launch structures for assembling and servicing the rockets before launch. Also, the launch structure must hold the rocket in a vertical position until lift-off and must deflect the exhaust plume in a safe direction to prevent erosion of the ground and structure under the launch pad. These launch structures are expensive to build and expensive to operate. There are a limited number of them around the world, which places substantial operational limitations on access to space.

An alternative to a vertically launched ballistic rocket is an aero-assisted "winged" spacecraft, or a spaceplane—a vehicle, which can take off horizontally from a runway like a conventional airplane. Such a spaceplane is known as an aero-assisted vehicle because it uses wings and their interaction with the air to provide lift. In order to minimize aerodynamic losses during ascent through the atmosphere, the spaceplane must have high wing loading; i.e., the ratio of the spaceplane's weight to its wing area must be relatively large. Unfortunately, this constraint requires extremely high take-off airspeed, which is incompatible with the use of runways of most conventional airfields.

The use of a non-powered glider to launch an aero-assisted spacecraft or spaceplane from a conventional runway is known in U.S. Pat. No. 5,255,873 to R. Nelson (1993). Nelson proposed a non-powered reusable wing glider attached to the upper surface of the spaceplane to form a glider-spaceplane "stack". Nelson envisioned a prolonged subsonic flight of the stack through a substantial part of the lower, dense atmosphere, with staging (separation of the wing glider from the spaceplane) occurring at an altitude of about 5 km. Thus, the wing area of the glider is substantially constrained in order to reduce atmospheric drag, resulting in a very high take-off airspeed of over 500 km/h (280 knots). This requirement for very high take-off airspeed is unrealistic since it not only greatly exceeds existing technical capabilities of conventional technologies used for the undercarriage of existing flight vehicles, but it also severely limits the choice of acceptable runways that can accommodate such operation.

In addition, Nelson's glider had no undercarriage and was dependent upon the spaceplane to provide an undercarriage, thus limiting payload diversity. The undercarriage was subsequently dropped from the spaceplane after take-off. Also, the wing planform (i.e., the contour of the wing as viewed from above) of the glider was constrained to a specific shape configured with a high aspect ratio. This limitation results in weaker mechanical strength as compared, for example, with a delta wing, which has an aspect ratio close to unity. In addition to the above, Nelson's glider could not be used as a launch platform for ballistic rockets. To best of my knowledge, this concept was never used for launch to space. My concept is unconstrained by any of the limitations implicit in Nelson's art.

Another alternative to the launch of ballistic rockets from the ground is an air-deployed, lift-assisted launch. The vehicle to be launched is carried to the desired launch point by a customized airplane. At the launch point, the vehicle is released from the airplane, and the propulsion system of the vehicle is activated. This method of launch has been known for a few decades. A detailed review of various versions of this approach is published by N. & M. Sarigul-Klijn (AIAA Paper 2001-4619). The only successful implementation of this approach for actual launches to space that I am aware of is the launch of a ballistic rocket suspended under a conventional aircraft, as shown in U.S. Pat. No. 4,901,949 to A. Elias (1990). In this method, the rocket is partially aero-assisted. It has a small wing to facilitate initial ascent of the vehicle.

As for the launch of aero-assisted vehicles, the only approaches I have found are shown in U.S. Pat. Nos. 5,626,310 and 6,029,928 to M. Kelly (1997, 2000). Kelly envisioned towing the aero-assisted launch vehicle as a glider by a conventional aircraft. Due to high wing loading of the vehicle, the towing plane must take off while the towed vehicle to be launched is still rolling out. Thus a relatively long runway is required. Insofar as I am aware, this method has never been used in practice.

Lift-assisted, air-deployed launch of spaceplanes is also known. The research rocket plane X-15 was the first spaceplane in early 60s of the last century that actually reached space beyond altitude of 100 km. More recently, a private spaceplane named SpaceShipOne made three successful flights to space to even higher altitudes. X-15 was launched from a customized B-52 bomber, and SpaceShipOne was launched from a custom-made high-altitude jet plane named White Knight.

In all air-launch methods known in the prior art, the vehicle is delivered to the desired launch altitude by the carrier aircraft as a passive payload. This places a substantial limitation on the initial weight of the launch vehicle. Not incidentally, Orbital Sciences Corp., the assignee of the Elias patent, is currently using this method for launches of their smallest rocket, Pegasus, while larger rockets produced by this company are launched from conventional ground facilities.

To sum up, ground launch to space is associated with need to use expensive ground structures for rockets and/or dedicated runways for spaceplanes. The air-launch to space is associated with limitations on initial weight for space launch vehicles, both rockets and spaceplanes. Thus all launches of rockets and spaceplanes to space have heretofore substantial operational limitations.

SUMMARY OF THE INVENTION

In accordance with one aspect, the launch of a space vehicle, a rocket and/or spaceplane, is assisted by attaching it to a non-powered aircraft that has an undercarriage and wings to enable take-off at a conveniently low take-off airspeed, as well as control surfaces to provide flight control during launch and return to ground. The launch is conducted in the form of an aircraft-like take-off from a conventional runway. I call this aircraft a Non-powered, Aero-assisted Pre-stage (NAP). The NAP facilitates horizontal launch of the space vehicle, with propulsion provided by the space vehicle and rollout capability and along with aerodynamic lift provided by the NAP. Ample thrust from main engines of the space vehicle is combined with ample wing area of the NAP, which is not constrained by the requirement, as in prior art, to fly through a substantial part of the lower atmosphere. This enables short-distance take-off at conventional airspeeds. The space vehicle is released from the NAP as soon as safe separation altitude is reached, whereupon the space vehicle begins its ascent to space, and the NAP glides back to the ground. In other words, the NAP is a highly flexible, self-contained, pre-stage glider platform capable of accepting an extensive variety of payloads ranging from ballistic rockets to spaceplanes and carrying these payloads to a suitable launch orientation and altitude, and returning to Earth and landing after separation. Furthermore, its wing design is preselected to adapt to the chosen payload so that moderate take-off airspeeds can be maintained, thus enabling launch operations from conventional runways.

DRAWINGS

Figures

DRAWINGS

Reference Numerals

10—Non-powered aero-assisted pre-stage (NAP)
11—Vertical stabilizer, a fin
12A—Control surface, an elevon
12B—Control surface, a rudder
12C—Control surface, an elevator
12D—Control surface, an aileron
13—Main landing gear employing wheels, floats, air cushions, or skids
14—Nose landing gear employing wheels, floats, air cushions, or skids
15—Wing struts
16—Wing wires
17—Longitudinal notch
18—Low-power strap-on self-transportation propulsion means
20A—Vehicle to be launched, a ballistic rocket
20B—Vehicle to be launched, an aero-assisted vehicle
30—Hold-and-release mechanism

DETAILED DESCRIPTION OF THE INVENTION

Figure 1A:
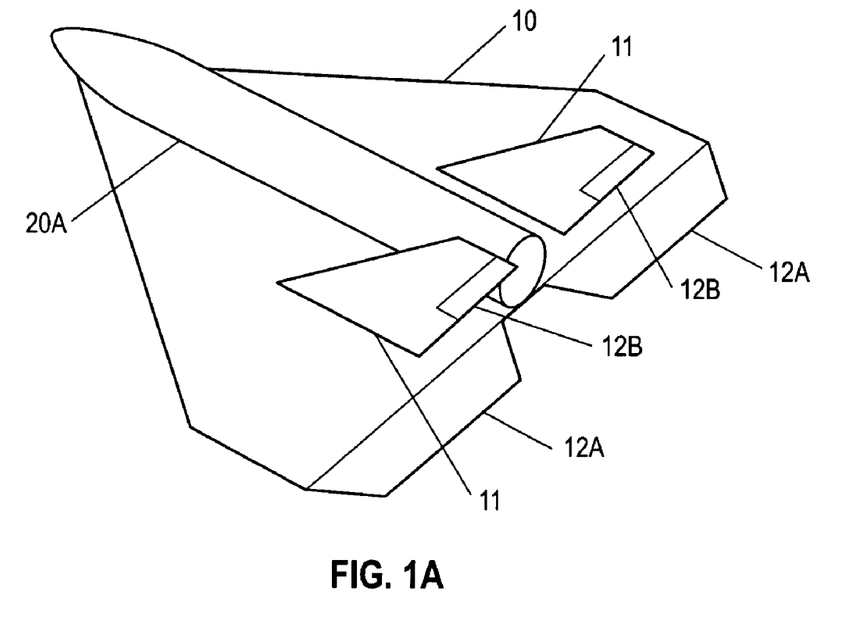
FIGS. 1A and 1B are perspective views of NAP-vehicle stack for use with a ballistic rocket (FIG. 1A) and with an aero-assisted flight vehicle (FIG. 1B), the NAP being a custom-made delta-wing glider.

First Embodiment, Custom-Designed NAP as Pre-Stage of Rocket—FIG. 1A

FIG. 1A shows a first embodiment of an airframe or aircraft structure 10 for assisting the launch of a ballistic rocket 20A. Airframe 10 is an ascent-assisting means or Non-powered, Aero-assisted Pre-stage, hereafter NAP. NAP 10 implemented as a custom-designed delta-wing glider to be used as a pre-stage for a ballistic rocket 20A. Rocket 20A may be either a single- or multiple-stage ballistic rocket, both of which are well-known in the art, and rocket 20A may or may not have personnel or animals on board. The NAP may have various forms as will be disclosed, and the reference numeral "10" refers to all of these forms.

As stated, heretofore ballistic rockets were launched either (1) from the ground, or (2) from a customized airplane. The first approach requires expensive ground structures. The second approach places substantial limitations on the initial weight of the rocket. Use of the NAP eliminates both problems: NAP 10 enables launch of ballistic rocket 20A using a conventional runway instead of dedicated ground structures, and the rocket is launched on its own power instead of being carried to launch altitude as a passive payload. Unlike prior art arrangements, the separation of NAP 10 from rocket 20A occurs at a low altitude, i.e., a few hundred meters, and it does not hinder subsequent ascent of the rocket through dense lower atmosphere. Because of this, the wing area of NAP 10 can be large enough to enable the take-off of the NAP-vehicle stack at a reasonably low airspeed, comparable or even less than that of conventional jet aircraft. Use of its own power from inception lifts limitations on the initial weight of the rocket, which limitations are intrinsic to an air launch.

In order to facilitate the launch of vehicle 20A it is mated to NAP 10 so that the flight directions of vehicle 20A and NAP 10 are aligned, and they for a rigid stack. The airframe of NAP 10 has a suitable aerodynamic shape to provide aerodynamic lift sufficient for take-off and ascent until separation. NAP 20 has a suitable undercarriage (not shown) to enable it to take-off from a runway or aircraft carrier. In the embodiment of FIG. 1A, NAP 10 is a delta-wing glider with an aspect ratio close to unity, which ensures enhanced mechanical strength, thus minimizing own weight of the NAP. NAP 10 has two fins 11 and control surfaces in the form of elevons 12A and rudders 12B. Elevons 12A and rudders 12B are operated by a flight control system (not shown), which is implemented based on well-known engineering solutions of eight control systems of unmanned aerial vehicles (UAVs).

Vehicle 20A is carried on the upper surface of NAP 10. It is mated to the NAP using a conventional hold-and-release mechanism (not shown). The method of mating vehicle 20A to NAP 10 is well known to those who are familiar with the engineering solutions involved in launch of missiles and rockets from aircraft or ground launchers. For example, the mating hardware used for the air-to-air missile AIM-54 Phoenix and surface-to-air missile MIM-23 Hawk may be used with suitable size and strength modifications. Thus, although details may vary with the weight of vehicle 20A, the principles are well-developed and can be implemented on a case-by-case basis.

Operation—First Embodiment in Conjunction with Ballistic Rocket

Operation of first embodiment is as follows. The NAP-vehicle stack is placed on the runway. The engine of the rocket is ignited, the NAP-vehicle stack rolls-out (i.e., accelerates along the horizontal runway to take-off speed), takes off, and climbs to the separation point using propulsion from rocket. During this phase, control surfaces of the NAP are used for flight control in a conventional manner.

At the separation point, which may be at attitude of a few hundred meters, the hold-and-release mechanism separates vehicle 20A from NAP 10. After separation, NAP 10 makes a 180-degree turn, and glides back to the launch site for subsequent reuse or disposal. Vehicle 20A then proceeds along its ascent trajectory in conventional fashion.

Figure 1B:
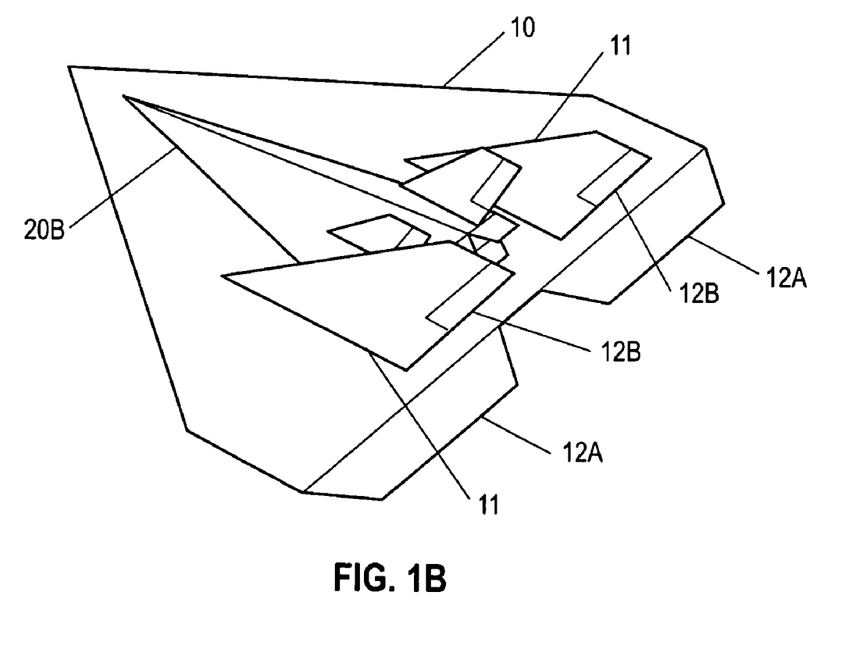

Second Embodiment—Custom Designed NAP as a Pre-Stage of a Spaceplane—FIG. 1B FIG. 1B shows a second embodiment of NAP 10 implemented as a custom-designed delta-wing glider to be used as a pre-stage of an aero-assisted single-stage or multi-stage flight vehicle (spaceplane) 20B. As stated above, in existing prior-art arrangements spaceplanes were launched either (1) from the runway at unrealistically high take-off airspeeds, or (2) from customized airplanes. The first approach placed extraordinary requirements that greatly exceed existing technical capabilities of conventional technologies used for the undercarriage of existing flight vehicles. Also, it severely limited the choice of acceptable runways that can accommodate such operation. The second approach placed substantial limitations on the initial weight of the spaceplane.

Use of the NAP eliminates both problems: NAP 10 enables the launch of spaceplane 20B from a conventional, rather than from a dedicated runway, and the spaceplane is launched on its own power instead of being carried to launch altitude as a passive payload. Unlike the prior art, separation of NAP 10 from spaceplane 20B occurs at a low altitude, of a few hundred meters, and it does not hinder subsequent ascent of the spaceplane through dense lower atmosphere. Because of this, as with launch of ballistic rockets, the wing area of NAP 10 can be large enough to enable the take-off of the NAP-vehicle stack at a reasonably low airspeed, comparable or even less than that of conventional jet aircraft. As with launch of ballistic rockets, use of own power from inception lifts limitations on the initial weight of the spaceplane, which are associated with air-launch.

In order to facilitate the launch of vehicle 20B it is mated to NAP 10 so that the flight directions of vehicle 20B and NAP 10 are aligned, and they for a rigid stack. The airframe of NAP 10 has a suitable aerodynamic shape to provide aerodynamic lift sufficient for take-off and ascent until separation. NAP 20 has suitable undercarriage (not shown) to enable it to take-off from a runway or aircraft carrier. In the embodiment of FIG. 1B, NAP 10 is a delta-wing glider with an aspect ratio close to unity, which ensures enhanced mechanical strength, thus minimizing own weight of the NAP. NAP 10 has two fins 11 and control surfaces in the form of elevons 12A and rudders 128. Elevons 12A and rudders 128 are operated by a flight control system (not shown), which is implemented based on well-known engineering solutions of flight control systems of unmanned aerial vehicles (UAVs).

Vehicle 20B is carried on the upper surface of NAP 10. It is mated to the NAP using a conventional hold-and-release mechanism 30 (not shown). As stated, the method of mating vehicle 20B to NAP 10 is well known to those who are familiar with the engineering solutions involved in mating of the Space Shuttle Orbiter to its External Tank for space launch, or to the Boeing 747 Shuttle Carrier Aircraft for transportation by air to Kennedy Space Center. Although details may vary with the weight of vehicle 20B, the principles are well-developed and can easily be implemented for the present NAP-vehicle stack.

Operation—Second Embodiment in Conjunction with Spaceplane

Operation of the second embodiment of FIG. 1B with the spaceplane proceeds in essentially the same fashion as with the ballistic rocket of FIG. 1A. The NAP-vehicle stack is placed on the runway. The engine of the spaceplane is ignited, the NAP-vehicle stack rolls-out, takes off, and climbs to a separation point using propulsion from vehicle. During this phase, control surfaces of the NAP are used for flight control in a conventional manner.

At the separation point, which may be at altitude of a few hundred meters, the hold-and-release mechanism separates vehicle 20B from NAP 10. After separation, NAP 10 makes a 180-degree turn, and glides back to the launch site for subsequent reuse or disposal thereof. Vehicle 20B then proceeds along its ascent trajectory in conventional fashion.

Figure 2A:
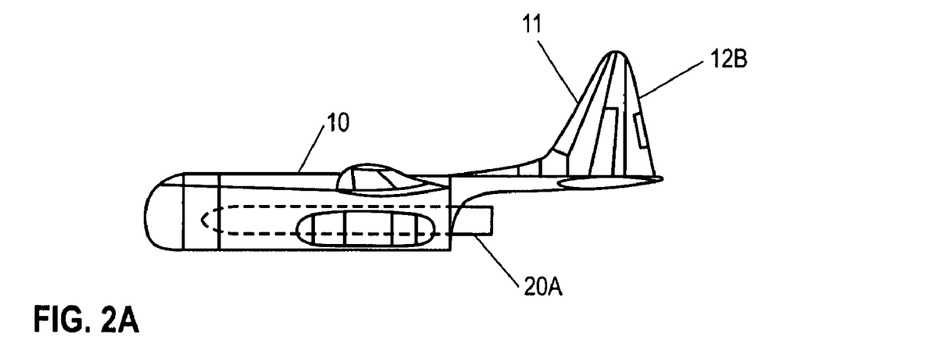
FIGS. 2A to 2C are side (FIG. 2A), bottom (FIG. 2B), and rear (FIG. 2C) views of the NAP-vehicle stack for use with a ballistic rocket. The NAP shown is converted from an existing aircraft.
Figure 2B:
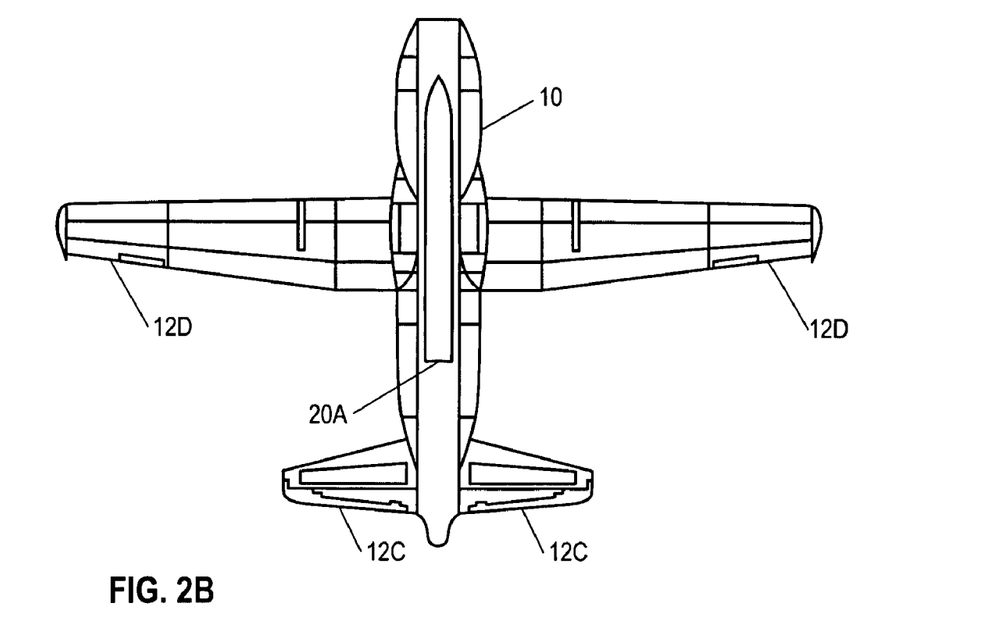
Figure 2C:
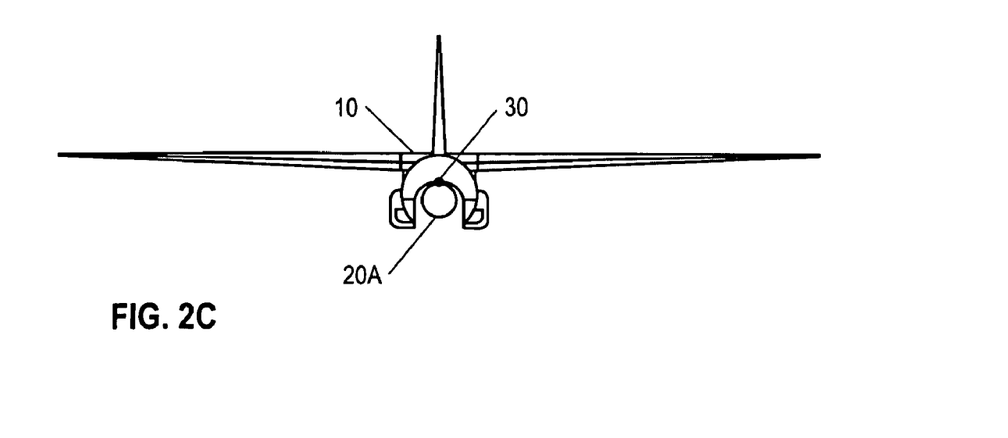

Third Embodiment, Modification of a Suitable Airplane—FIGS. 2A, 2B, and 2C

A third embodiment of the NAP is illustrated in FIGS. 2A, 2B, and 2C in conjunction with a single-stage or multi-stage ballistic rocket. FIGS. 2A, 2B, and 2C are three-views of NAP 10 in conjunction with ballistic rocket 20A. In this embodiment NAP 10 is implemented as a modification of a suitable airplane (a C-130 Hercules cargo plane in this example). All non-essential, superfluous systems are removed, and the airframe of the airplane is modified to open the inner volume of the airplane in the downward, forward, and backward directions so as to provide an unobstructed path for rocket 20A after it is dropped from the NAP and accelerates forward, and to prevent the exhaust plume of the rocket engine (not shown) from damaging the NAP 10.

The main landing gear (not shown) of the airplane can be used without modifications. The nose landing gear is split into two separate nose gear components (not shown) to provide an unobstructed path for the forward motion of rocket 20A after separation from NAP 10. The control surfaces of the airplane—rudder 12B, elevators 12C, and ailerons 12D—are used without modifications. These control surfaces are operated by a flight control system (not shown), which, as in the first embodiment, is implemented based on engineering solutions of flight control systems of unmanned aerial vehicles. Rocket 20A is mated to NAP 10 using a conventional hold-and-release mechanism. 30 (FIG. 2C) as before with suitable adjustments for the present stack.

Operation—Third Embodiment

Operation of the third embodiment is similar to that of the first embodiment. The stack rolls-out on a conventional runway, takes off, and climbs to the separation point in a fashion conceptually identical to those of the first and second embodiments. At the separation point, hold-and-release mechanism 30 releases rocket 20A from NAP 10 and the NAP proceeds downward. Separation is assisted by the gravity component across the flight path. After separation, the operation proceeds similarly to the operation of the first embodiment: NAP 10 glides back to the launch site for subsequent reuse or disposal, and rocket 20A proceeds along its ascent trajectory in conventional fashion.

Other Embodiments—FIGS. 3A to 3C and 4A to 4C

Figure 3A:
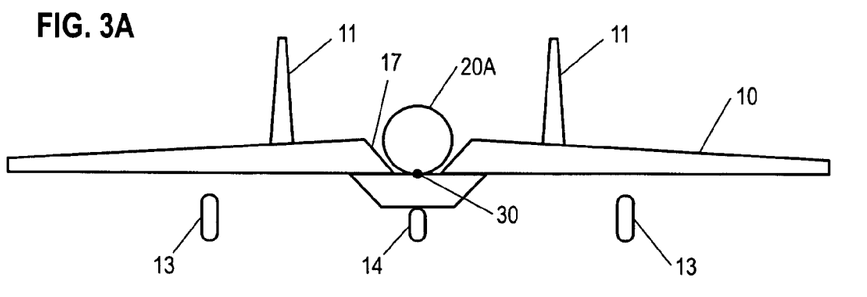
FIGS. 3A to 3C are views of the NAP-vehicle stack for a ballistic rocket showing various embodiments of the NAP as a custom-made, delta-wing glider with three different ways of mating the vehicle to the NAP.
Figure 3B:
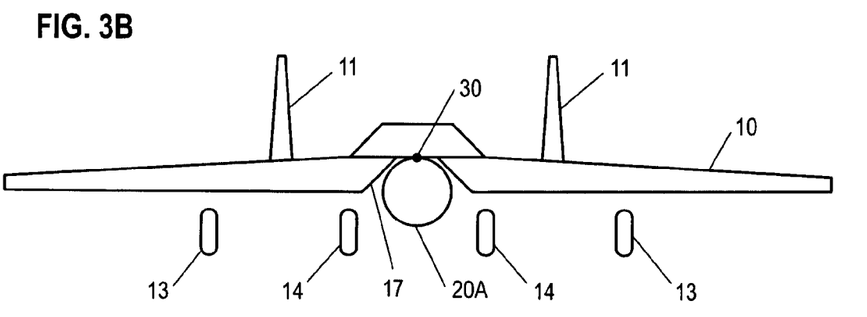
Figure 3C:
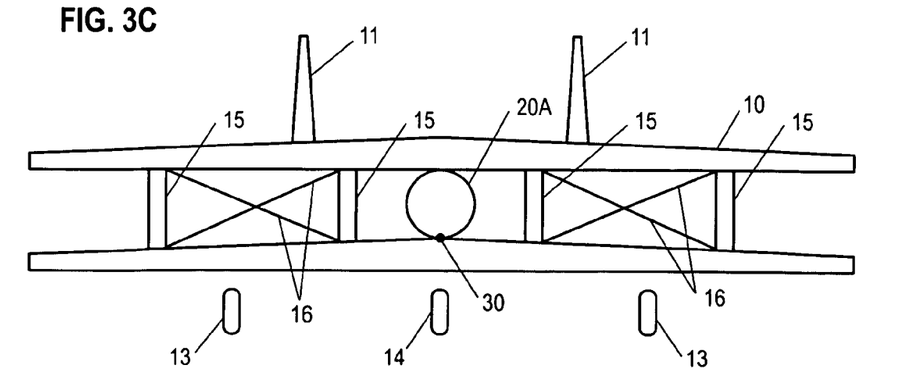

A number of embodiments are illustrated ins FIGS. 3A, 3B, and 3C. FIG. 3A is a rear view of the NAP in the form of a delta-wing glider in conjunction with ballistic rocket carried on the upper surface of the NAP; FIG. 3B is a rear view of the NAP in the form of a delta-wing glider in conjunction with ballistic rocket carried on the lower surface of the NAP, and FIG. 3C is a rear view of the NAP in the form of a biplane delta-wing glider with ballistic rocket carried between the upper and lower wings.

FIG. 3A—Vehicle carried on upper surface of NAP: The vehicle (rocket or spaceplane) may be carried on the upper surface of NAP 10 as shown in FIG. 3A when the vehicle is rocket. 20A. This is more suitable for heavier vehicles because the structure of the NAP itself can provide additional support for the vehicle, thus reducing the load on hold-and-release mechanism 30. The NAP is implemented as a delta-wing glider with aspect ratio close to unity, which ensures enhanced mechanical strength, thus minimizing the weight of the NAP. NAP 10 has two vertical fins 11 and a suitable airplane landing gear 13, 14 to enable it to take-off from a runway or aircraft carrier. A longitudinal notch 17 positions the propulsion thrust vector of rocket 20A so as to pass as close to the center of gravity of the NAP as practicable in order to reduce the moment arm of the thrust vector producing undesirable diving moment.

FIG. 3B—Vehicle carried on lower surface of NAP: Alternatively, the vehicle may be carried underneath the NAP, as shown in FIG. 3B for the case of rocket 20A. This provides better conditions for the separation of the vehicle due to the gravity component across the flight path. The NAP is implemented as a delta-wing glider with two fins 11. The aspect ratio of the wing is close to unity, which ensures enhanced mechanical strength, thus minimizing own weight of the NAP. In this case, NAP 10 has landing gear components 13 and 14 with longer struts to accommodate the vertical cross-dimension of the vehicle. Also, splitting the nose gear into two separate nose gear components 14 is necessary in order to provide an unobstructed path for forward motion of vehicle 20A after separation from the NAP 10. A longitudinal notch 17 serves the same purpose as in FIG. 3A and provides better positioning of the thrust vector of rocket 20A to reduce an undesirable pitching moment.

FIG. 3C—Biplane NAP: To further increase the available wing area within given dimensional constraints, the design of the NAP may be of a biplane rather than of a monoplane configuration, as illustrated in FIG. 3C, where the vehicle is rocket 20A. Here the NAP 10 has a delta-wing platform with aspect ratio close to unity. It has two parallel (upper and lower) wings, two fins 11 and a suitable airplane landing gear 13, 14. Wing struts 15 and wing wires 16 serve as, correspondingly, compression members and tension members to ensure rigidity of the biplane wing structure.

Figure 4A:
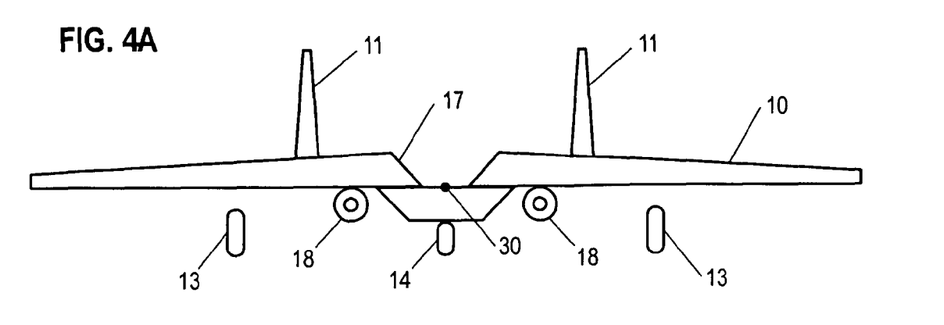
FIGS. 4A to 4C are views of the NAP embodiments of FIGS. 3A to 3C in the self-transportation mode, with low-thrust strap-on propulsion means in the form of jet engines.
Figure 4B:
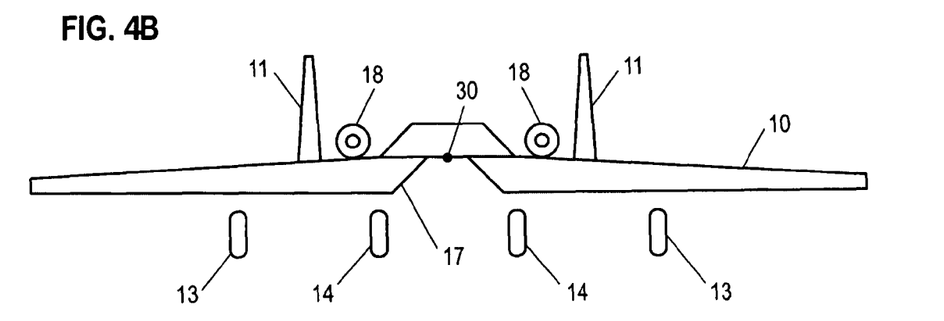
Figure 4C:
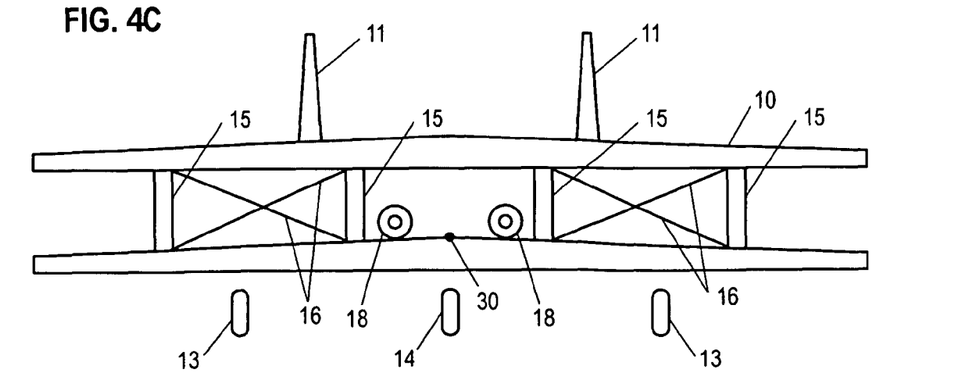

FIGS. 4A, 4B, and 4C—NAP with Self-Transportation Means: FIGS. 4A to 4C show embodiments of NAP 10 similar to those depicted in FIGS. 3A to 3C but without the payload attached. Instead, shown is the addition of a low-thrust strap-on propulsion means 18 for purposes of for short-distance self-transportation, flight back to launch site, and test flights. The propulsion means shown in FIGS. 4A to 4C are suitable jet engine. The NAP is implemented as a delta-wing glider with aspect ratio close to unity, which ensures enhanced mechanical strength, thus minimizing the weight of the NAP. NAP 10 has two vertical fins 11 and a suitable airplane landing gear 13, 14 to enable it to take-off from a runway or aircraft carrier. A longitudinal notch 17 shown in FIGS. 4A and 4B positions the propulsion thrust vector of the vehicle to be launched so as to pass as close to the center of gravity of the NAP as practicable in order to reduce the moment arm of the thrust vector producing undesirable pitching or diving moments. The embodiment shown in FIG. 4C has two parallel (upper and lower) wings, two fins 11 and a suitable airplane landing gear 13, 14. Wing struts 15 and wing wires 16 serve as, correspondingly, compression members and tension members to ensure rigidity of the biplane wing structure. A hold-and-release mechanism 30 is not used during self-transportation.

Operation—FIGS. 3A to 3C and 4A to 4C

Operation of the embodiments of FIGS. 3A to 3C is similar to that of the first to third embodiments. Roll-out, take-off, and climb of the NAP-vehicle stack to separation point are conceptually identical to those of the first and embodiment. At the separation point, hold-and-release mechanism 30 releases vehicle from NAP. If vehicle is released downward, as in embodiment shown in FIG. 3B, its separation from NAP is assisted by the gravity component across the flight path. After separation, the operation proceeds similarly with the operation of the first and second embodiments: NAP glides back to the launch site for subsequent reuse or disposal of, and the vehicle proceeds along its ascent trajectory in conventional fashion.

In the self-transportation mode shown in FIGS. 4A to 4C, the NAP is self-propelled and is not carrying a payload vehicle (not shown). Operations in this mode are intended for short-distance self-transportation, flight back to launch site, and test flights.

Advantages

From the description above, a number of advantages of my non-powered, aero-assisted pre-stage become evident. These advantages result from the capability to launch ballistic rockets and spaceplanes in a conventional airplane-like fashion, from a wide variety of conventional runways, with take-off airspeed comparable to, or lower than that of conventional jet airplanes, which capability is provided by the NAP:

(a) The number of potential launch sites can be substantially increased.
(b) The waiting time for launch will be decreased due to above increase of the number of available launch sites.
(c) There will be increased flexibility in launch operations providing a capability to launch on demand, when and where necessary.
(d) A wider variety of space operators will have access to space due to the above increase of the number of available launch sites.
(e) The pace of development of space exploration and utilization for the needs of humankind as a whole will be enhanced.

Conclusion, Ramifications, and Scope

Accordingly, the reader will see that the NAP in its various embodiments will facilitate launch of ballistic and aero-assisted vehicles (spaceplanes) in an airplane-like manner from conventional airfields without dedicated ground-launch structures. Some common features of the embodiments of the NAP are presented below:

The NAP has own undercarriage, which relaxes requirements for the undercarriage of enables launch of ballistic rockets and spaceplanes, The wing area of the NAP is not constrained by a requirement of sustained flight through the lower atmosphere, which greatly reduces the take-off airspeed, and as a result, makes it possible to launch ballistic rockets and spaceplanes from conventional runways, The wing planform of the NAP is not constrained by requirement of a prolonged flight through lower, dense atmosphere, thus a wide variety of planforms becomes possible, in particular, those with aspect ratio close to unity, such as delta wings having enhanced mechanical strength, thus minimizing own weight of the NAP.

Correspondingly, the number of potential launch sites will increase substantially, reducing the waiting time for launch, increasing flexibility in launch operations, opening the access to space to a wider variety of potential space operators, and as a result, increasing the pace of space exploration and utilization.

While the above description contains many specificities, these should not be construed as limitations of the scope of any embodiment, but as exemplifications of the presently preferred embodiments thereof. Many other ramifications and variations are possible within the teachings of the various embodiments. For example:

Take-off of the NAP-vehicle stack and landing of the NAP can be performed on a runway, aircraft carrier, or suitable body of water.

Transportation of the NAP to the launch site can be performed in a disassembled form using a conventional aircraft.

Other alternatives, applicable to the embodiments described above, include:

Reusable v. expendable NAP: Depending upon the mission, the fly-away cost of NAP may represent an insignificant fraction of the total cost of the mission; in this case reuse of NAP may not be justified.

The contour of the wing as viewed from above (wing planform) of the NAP: The planform may be chosen from a variety of geometrical shapes comprising triangular, bi-trapezoidal, rectangular, and elliptical.

Landing gear: Depending upon the vehicle to be launched and the mission profile, the landing gear may be retractable, fixed (including wheels, floats, air cushions, and skids), or absent (in the case of a spaceplane carried on the bottom of the NAP, when the landing gear of the spaceplane is used for the take-off of the stack).

Flight control of NAP: There are several flight-control possibilities, which can be used separately or in combination:

Flight control throughout the flight of the NAP can be conducted autonomously by the onboard computer of NAP—this approach is widely used for flight control of unmanned aerial vehicles (UAVs), Flight control throughout the flight of the NAP can be conducted from the ground or air, by an automated system or a human operator, or by a combination of thereof, Flight control can be conducted from vehicle carried by NAP, at least until separation.

All the varieties of possible embodiments of the NAP lie well within the common engineering knowledge in the aerospace industry, and the NAP can be built using conventional tools and fabrication processes routinely used in this industry.

Other ramifications in size, style, arrangement, and applications for the NAP are possible. Thus, the scope should be determined by the appended claims and their legal equivalents, and not by the examples given.

I claim:

1. A non-powered aero-assisted pre-stage for launch of single-stage and multiple-stage ballistic rockets and aero-assisted vehicles, henceforth referred to as space vehicles, comprising:
    a. an airframe which can be attached to a space vehicle to form a stack, said airframe having an aerodynamic shape capable of providing aerodynamic lift sufficient for take-off at airspeeds of subsonic jet airplanes, and ascent of said vehicle using propulsion of said vehicle,
    b. said airframe having a planform with a low enough aspect ratio, to ensure mechanical strength, sufficient to carry said space vehicle,
    c. said airframe having an undercarriage for supporting said stack on a runway during roll-out and take-off,
    d. said airframe having a flight control system for providing flight control of said stack and glide of said airframe after separation, and
    e. said airframe having a hold-and-release mechanism for holding said vehicle to said airframe and releasing said vehicle at a separation altitude,
    whereby said non-powered aero-assisted pre-stage provides a capability to launch both said ballistic rockets and aero-assisted flight vehicles from airport runways in a conventional airplane-like fashion.

2. The non-powered aero-assisted pre-stage of claim 1 wherein said airframe has a delta-wing planform.

3. The non-powered aero-assisted pre-stage of claim 2 wherein said airframe has a longitudinal notch to accommodate the thrust vector of said vehicle to be launched, said notch being adjacent the center of gravity of said airframe.

4. The non-powered aero-assisted pre-stage of claim 2 wherein said airframe has a biplane configuration to increase the total wing area and reduce take-off airspeed.

5. The non-powered aero-assisted pre-stage of claim 1 wherein said undercarriage for providing roll-out is selected from the group consisting of wheels, floats, air cushions, and skids.

6. The non-powered aero-assisted pre-stage of claim 1 wherein said airframe has upper and lower surfaces and said hold-and-release mechanism is located on one of said surfaces of said airframe.

7. The non-powered aero-assisted pre-stage of claim 1 wherein said airframe is converted from an airframe of a suitable aircraft with necessary modifications for preventing the exhaust plume of the engine of said space vehicle from damaging said pre-stage and to ensure unobstructed release of said space vehicle at the separation point.

8. The non-powered aero-assisted pre-stage of claim 1 wherein said airframe may have optional low-power propulsion means selected from the group consisting of engine-driven propellers, jet engines, and rocket engines, whereby said low-power propulsion means can be used for short-distance self-transportation, and test flights.

9. The non-powered aero-assisted pre-stage of claim 1 wherein said space vehicle is selected from the class comprising ballistic rockets and aero-assisted flight vehicles.

10. The non-powered aero-assisted pre-stage of claim 1, further including a space vehicle attached to said airframe to form a stack.

11. The non-powered aero-assisted pre-stage of claim 1 wherein said airframe may have optional low-power propulsion means selected from the group consisting of engine-driven propellers, jet engines, and rocket engines, whereby said low-power propulsion means can provide short-distance self-transportation, and test flights.

12. A non-powered aero-assisted pre-stage for launch of single-stage and multiple-stage ballistic rockets and aero-assisted vehicles, henceforth referred to as space vehicles, comprising:
- ascent-assisting means which can be attached to a space vehicle to form a stack, said means providing aerodynamic lift sufficient for take-off and ascent of said vehicle using propulsion of said vehicle,
- said ascent-assisting means having an undercarriage for supporting said stack on a runway during roll-out and take-off,
- said ascent-assisting means having a flight control system for providing flight control of said stack and glide of said means after separation, and
- said means arranged to hold said space vehicle to said ascent-assisting means and release said ascent-assisting means at a separation altitude,
- whereby said ascent-assisting means provides a capability to launch said ballistic rockets and said aero-assisted flight vehicles from airport runways, with a take-off airspeed not exceeding that of subsonic jet airplanes.

13. The non-powered aero-assisted pre-stage of claim 12 wherein said ascent-assisting means has a delta-wing planform.

14. The ascent-assisting means of claim 13 wherein said ascent-assisting means has a longitudinal notch to accommodate the thrust vector, of said vehicle to be launched, said notch being adjacent the center of gravity of said airframe.

15. The ascent-assisting means of claim 13 wherein said ascent-assisting means have a biplane configuration to increase the total wing area and reduce take-off airspeed.

16. The non-powered aero-assisted pre-stage of claim 12 wherein said means arranged to provide roll-out is selected from the group consisting of wheels, floats, air cushions, and skids.

17. The non-powered aero-assisted pre-stage of claim 12 wherein said means arranged to hold said vehicle to said ascent-assisting means and release said ascent-assisting means at a separation altitude is located on upper or lower surface of said airframe.

18. The non-powered aero-assisted pre-stage of claim 12 wherein said ascent-assisting means is converted from an airframe of a suitable aircraft with modifications for preventing the exhaust plume of the engine of said space vehicle from damaging said pre-stage and to ensure unobstructed release of said space vehicle at the separation point.

19. The non-powered aero-assisted pre-stage of claim 12 wherein said space vehicle is selected from the class comprising ballistic rockets and aero-assisted flight vehicles.

20. The non-powered aero-assisted pre-stage of claim 12, further including a space vehicle attached to said airframe to form a stack.

* * * * *